United States Patent [19]
Lo et al.

[11] Patent Number: 5,462,994
[45] Date of Patent: Oct. 31, 1995

[54] PREPARATION OF CONJUGATED DIENE-MONOALKENYL ARENE BLOCK COPOLYMERS HAVING A LOW POLYDISPERSITY INDEX

[75] Inventors: Grace Y. Lo; Arnold L. Gatzke, both of Midland, Mich.

[73] Assignee: The Dow Chemical Company, Midland, Mich.

[21] Appl. No.: 187,583

[22] Filed: Jan. 27, 1994

[51] Int. Cl.$^6$ .................................................. C08F 297/04
[52] U.S. Cl. ........................ 525/314; 525/250; 525/271; 526/173
[58] Field of Search ..................... 525/314, 250, 525/271; 526/173

[56] References Cited

U.S. PATENT DOCUMENTS

| | | | |
|---|---|---|---|
| 3,652,516 | 3/1972 | Farrar | 526/173 |
| 3,734,973 | 5/1973 | Farrar | 526/173 |
| 4,200,718 | 4/1980 | Tung et al. | 526/173 |
| 4,201,729 | 5/1980 | Tung et al. | 526/173 |
| 4,205,016 | 5/1980 | Tung et al. | 556/143 |
| 4,427,837 | 1/1984 | Tung et al. | 525/314 |
| 4,431,777 | 2/1984 | Tung et al. | 525/314 |
| 4,525,532 | 6/1985 | Tung et al. | 525/98 |
| 4,614,768 | 9/1986 | Lo | 525/250 |
| 4,960,842 | 10/1990 | Lo et al. | 526/175 |
| 5,089,572 | 2/1992 | Marchand et al. | 526/77 |
| 5,162,406 | 11/1992 | Meyer et al. | 524/101 |
| 5,171,800 | 12/1992 | Broustert | 525/314 |

OTHER PUBLICATIONS

Szwarc, M., et al., "Simultaneity of Initiation and Propagation in Living Polymer Systems," *Macromolecules*, vol. 20, pp. 445–448.

Roovers, J. E. L., et al., "The Reaction of tert–Butyllithium with Styrene and Isoprene. A Comparison of Chain Initiation with the Isomers of Butyllithium," *Macromolecules*, May–Jun. 1975, vol. 8, No. 3, pp. 251–254.

Madani, A. E., et al., "Kinetics of the Polymerization of Isoprene Initiated by α,ω–dilithiopolyisoprene in Hexane," *Makromol. Chem., Rapid Commun.*, 1990, vol. 11, pp. 329–335.

Bandermann, F., et al., "Bifunctional Anionic Initiators: A Critical Study and Overview," *Makromol. Chem.*, 1985, vol. 186, pp. 2017–2024.

*Primary Examiner*—James J. Seidleck
*Assistant Examiner*—M. L. Warzel
*Attorney, Agent, or Firm*—Norman L. Sims

[57] ABSTRACT

The invention is a process for the preparation of a block copolymer which corresponds to the formula ABA wherein A comprises units derived from one or more monoalkenyl arenes; and B comprises units derived from one or more conjugated dienes and the residuum of a difunctional initiator; wherein the process comprises:

I) contacting (a) a difunctional initiator capable of initiating the polymerization of a compound containing a double bond with (b) a portion of conjugated diene in a portion of hydrocarbon solvent under conditions such that the conjugated diene polymerizes to a degree of polymerization of 30 or greater;

II) contacting with the polymerization mixture of I additional conjugated diene and hydrocarbon solvent under conditions such that the added conjugated diene polymerizes; and III) contacting with the polymerization mixture of II a monoalkenyl arene to prepare a block copolymer having a number average molecular weight of about 31,500 to about 400,000 and an average weight percent of monoalkenyl arenes contained in the block copolymer of from about 5 percent to about 50 weight percent under conditions such that the monoalkenyl arene polymerizes.

In another embodiment, the invention relates to the polymers prepared from this process. Such products demonstrate high tensile strength, a low polydispersity index and do not require the use of a co-initiator to achieve such properties.

22 Claims, No Drawings

PREPARATION OF CONJUGATED DIENE-MONOALKENYL ARENE BLOCK COPOLYMERS HAVING A LOW POLYDISPERSITY INDEX

BACKGROUND OF THE INVENTION

This invention relates to a process for the preparation of conjugated diene-monoalkenyl arene block copolymers having a low polydispersity index and high tensile strength. This invention further relates to the block copolymers prepared by this process.

Block copolymers of conjugated dienes and monoalkenyl arenes are well known in the art and are employed for a variety of purposes, for example, in adhesives and as elastomers. Generally, one block comprises a block derived from a monoalkenyl arene homopolymer or copolymer thereof. Usually, another block comprises an elastomeric polymer, generally derived from a conjugated diene. To obtain triblock copolymers of maximum uniformity, it is desirable to initiate polymerization employing a difunctional lithium initiator.

Anionic polymerization processes are well known in the art, for example, U.S. Pat. No. 4,431,777, incorporated herein by reference. Difunctional initiators for anionic polymerization are well known; see U.S. Pat. Nos. 4,169,115; 4,172,100; 4,172,190; 4,427,837; 4,196,154 and 4,205,016.

Generally, the use of the above-described difunctional lithium-containing initiators results in the preparation of polymerization products having a broader molecular weight range than is desired. In certain applications, particularly adhesives, this may result in inferior product properties. It is recognized that monoalkenyl arene-conjugated diene-monoalkenyl arene triblock polymers of narrower molecular weight distribution tend to produce adhesive formulations having improved shear hold strength and the triblock polymers normally possess improved tensile rupture strength compared to broader molecular weight versions thereof. Accordingly, for many applications, it would be desirable to prepare block copolymers having a relatively narrow molecular weight distribution, especially distributions wherein the ratio of weight average molecular weight ($M_w$) to number average molecular weight ($M_n$) is less than or equal to 1.4 and preferably less than 1.3.

One technique that may be employed to produce narrow molecular weight distribution polymers is the addition of certain polar compounds to the reaction mixture. Disadvantageously, however, in the polymerization of butadiene- or isoprene-containing mixtures in the presence of polar compounds, the resulting polymer possesses a high percentage of undesired vinyl functionality, that is, 1,2- or 3,4-addition units. Such addition products are collectively referred to hereinafter as polymers having 3,4-addition microstructure. Polymers having this microstructure generally possess inferior elastomer properties.

In an attempt to narrow the molecular weight distribution, co-initiators, such as lithium alkoxides or N,N,N',N'',N''-pentamethyldiethylenetriamine (PMDETA), were used as co-initiators in U.S. Pat. No. 4,960,842. The block copolymers prepared using the triamine co-initiator demonstrated good tensile strength. Pressure sensitive adhesives prepared from such triblock polymers demonstrate good adhesive properties. However, the co-initiators are not incorporated into the polymer backbone of the chains and are left in the solvent recycle stream, which must be removed to acceptable levels in production scale polymerizations. Such removal and disposal in a process stream presents significant problems.

Therefore, there is a need to prepare block copolymers of conjugated dienes and monoalkenyl arenes which have a narrow molecular weight distribution (polydispersity index) and high tensile strength in the absence of co-initiators which remain in the solvent stream.

SUMMARY OF THE INVENTION

The invention is a process for the preparation of a block copolymer which corresponds to the formula ABA wherein A comprises units derived from one or more monoalkenyl arenes; and B comprises units derived from one or more conjugated dienes and the residuum of a difunctional initiator; wherein the process comprises:

I) contacting (a) a difunctional initiator capable of initiating the polymerization of a compound containing a double bond with (b) a conjugated diene in a hydrocarbon solvent wherein the concentration of difunctional initiator is from about 0.002 moles/liter to about 0.06 moles/liter and the molar ratio of conjugated diene to difunctional initiator is about 30:1 to about 1000:1 under conditions such that the conjugated diene polymerizes to a degree of polymerization of 30 or greater;

II) contacting with the polymerization mixture of I a sufficient amount of conjugated diene to prepare a polymer having a number average molecular weight of from about 30,000 to about 300,000 and hydrocarbon solvent such that the mixture has a solids content of from 5 to 30 percent by weight, under conditions such that the added conjugated diene polymerizes; and III) contacting with the polymerization mixture of II a sufficient amount of monoalkenyl arene to prepare a triblock copolymer having a number average molecular weight of about 31,500 to about 400,000 and an average weight percent of monoalkenyl arenes contained in the block copolymer of from about 5 percent to about 50 percent by weight under conditions such that the monoalkenyl arene polymerizes.

In another embodiment, the invention relates to the polymers prepared by this process. Such products demonstrate high tensile strength, a low polydispersity index and do not require the use of a co-initiator to achieve such properties.

DETAILED DESCRIPTION OF THE INVENTION

The block copolymers of the invention generally comprise a center block derived from conjugated diene units and containing in such block the residuum of a difunctional initiator. Generally, this block has a number average molecular weight of 30,000 or greater, more preferably 50,000 or greater and most preferably 70,000 or greater. Preferably, such block has a molecular weight of 300,000 or less, more preferably 250,000 or less and most preferably 200,000 or less. Conjugated dienes useful in this invention include straight- and branched-chain aliphatic hydrocarbons containing two double bonds attached to adjacent carbon atoms. Preferable conjugated dienes contain 4 to 6 carbon atoms and include butadiene, isoprene, 1,3-pentadiene, 1,3-hexadiene, 2,3-dimethylbutadiene and mixtures thereof. More preferably, such conjugated dienes contain from about 4 to about 5 carbon atoms and include, for example, butadiene, isoprene, cis-1,3-pentadiene, trans-1-3-pentadiene and mixtures thereof. The most preferred conjugated dienes are butadiene and isoprene.

The center block, B, also contains the residuum of the difunctional initiator used to initiate the anionic polymerization. Generally, this comprises difunctional initiator, absent the lithium atoms. The difunctional initiators useful in this invention comprise any difunctional organolithium initiator suitable for polymerization of unsaturated moieties under anionic polymerization conditions in hydrocarbon solvents. Preferable difunctional initiators are those wherein the carbon atom attached to the lithium moiety is also bonded to an aromatic moiety. More preferred difunctional initiators correspond to the formula

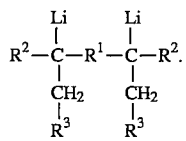

$R^1$ is independently in each occurrence an alkylene moiety, arylene moiety or biarylene moiety wherein the biarylene moiety is bridged by a direct bond, alkylene, sulfur or oxygen; and wherein the alkylene, arylene or biarylene moieties may be optionally substituted with one or more non-interfering substituents. $R^2$ is independently in each occurrence an alkyl, aryl, alkyl substituted aryl or aryl substituted alkyl moiety optionally substituted with one or more non-interfering substituents. $R^3$ is an alkyl moiety. $R^1$ and $R^2$ are selected such that each carbon bound to a lithium moiety is also bound to at least one aromatic carbon atom. $R^1$ is preferably a $C_{6-20}$ arylene or $C_{10-20}$ biarylene and most preferably a phenylene moiety. $R^2$ is preferably a $C_{6-20}$ aryl, $C_{1-20}$ alkyl or $C_{7-20}$ alkyl substituted aryl moiety. $R^3$ is preferably a $C_{1-20}$ alkyl moiety, more preferably a $C_{2-10}$ alkyl moiety and most preferably a sec-butyl moiety.

Among preferred difunctional organolithium initiators are those initiators described in U.S. Pat. Nos. 4,172,100; 4,172,190 and 4,196,154 (the relevant parts of all three patents are incorporated herein by reference) and the reaction product of sec-butyllithium and meta-diisopropenyl benzene. More preferred difunctional initiators include the addition product of sec-butyllithium and meta-diisopropenyl benzene; 1,3-phenylene-bis(3-methyl-1-(4-methylphenyl)pentylidene)bis(lithium) and 1,3-phenylene-bis(3-methyl-1-phenylpentylidene)bis(lithium). The preparation of such difunctional initiators is well known and described in the above-mentioned patents.

Non-interfering substituent means herein any moiety which does not significantly interfere with the ability of the compound or moiety to which it is attached to perform its stated function herein. In many instances, a non-interfering substituent is inert under the normal conditions of processing and use of the compound or moiety to which it is attached. Examples of preferred non-interfering substituents include alkyl and aryl moieties.

The other blocks (A blocks) of the block copolymer generally comprise, in polymeric form, monoalkenyl arenes. The term monoalkenyl arene monomer means herein a compound having an aromatic ring, preferably monocyclic, with an alkenyl moiety bound thereto which is capable of polymerizing under anionic conditions. Preferred monoalkenyl arenes correspond to the formula:

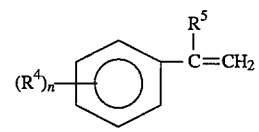

where n is an integer from 0 to 3, $R^4$ is an alkyl moiety containing up to 5 carbon atoms and $R^5$ is hydrogen or methyl. Preferred monoalkenyl arenes are styrene or alkyl substituted styrenes such as vinyl toluene (all isomers, alone or in admixture), α-methylstyrene, 4-tertiarybutylstyrene, 4-methylstyrene, 3,5-diethylstyrene, 3,5-di-n-butylstyrene, 4-(4-phenyl-n-butyl)styrene, 2-ethyl-4-benzylstyrene, 4-cyclohexylstyrene, 4-n-propylstyrene, 4-dodecylstyrene, mixtures thereof and the like. More preferred monoalkenyl arenes include styrene, vinyl toluene, α-methylstyrene and mixtures thereof. Even more preferred alkenyl arenes are styrene and mixtures of styrene and α-methylstyrene.

Preferably, the percentage of monoalkenyl arenes in the final block copolymer is 5 percent or greater, more preferably 10 percent or greater, and most preferably 14 percent or greater. Preferably, the percentage of monoalkenyl arenes in the final block copolymer is 50 percent or less, more preferably 45 percent or less, even more preferably 40 percent or less and most preferably 30 percent or less.

The polymers prepared by the process described herein preferably have a polydispersity index of 1.4 or less, more preferably 1.3 or less, and most preferably 1.2 or less. The polydispersity index is determined using gel permeation chromatography (GPC). Preferably, such polymers have a tensile strength at rupture of 1500 psi (10350 kPa) or greater, more preferably 2000 psi (13800 kPa) or greater and most preferably 2500 psi (17250 kPa) or greater. The tensile strength at rupture is determined according to the methods described in the examples hereinafter.

In Step I of the process for preparing the block copolymers, a portion of conjugated diene and a portion of the hydrocarbon solvent are contacted with all of the initiator used in the polymerization process. The applicants are not bound or limited by the theory described but, nevertheless, provide the theory to aid in the understanding of the basis for the claimed invention. It has been discovered that the cause of the unacceptably broad molecular weight distribution is the presence of monofunctional initiators, initiators in which one of the active lithium ends has become unintentionally deactivated in situ. The relative rates of polymerization of monofunctional initiator and difunctional initiator are significantly different, with the relative rate of the monofunctional initiator being much higher under normal polymerization conditions. It has been discovered that, by significantly increasing the concentration of difunctional initiator in the polymerization solution, the rate of difunctional initiation can be adjusted (increased) to approach the rate of the monofunctional initiator. Under such conditions, the molecular weight distribution is much narrower. After the polymer chains have propagated to a certain size, the difference in rate is not significant. The reaction mixture is polymerized until a degree of polymerization of 30 or greater is achieved, preferably 100 or greater and most preferably 200 or greater. Degree of polymerization is the average number of monomer units added to each polymer chain. The reaction is exothermic. To achieve reasonable rates, elevated temperatures are preferred.

The concentration of difunctional initiator in the hydrocarbon solvent during this step has as its practical upper limit the solubility limit of difunctional initiator in the hydrocarbon solvent. The lower limit is dictated by the concentration of difunctional initiator necessary such that the rate of propagation or polymerization of polymer chains initiated by difunctional initiators approaches the relative rate of propagation of polymer chains initiated by monofunctional initiators. Preferably, the concentration of difunctional initiator in the hydrocarbon solvent is 0.002 moles/liter or greater, more preferably 0.003 moles/liter or greater. Preferably, the highest concentration of difunctional initiator in the hydrocarbon solvent is 0.06 moles/liter or less and more preferably 0.03 moles/liter or less. Solvents useful in this process are aliphatic, cycloaliphatic or aromatic hydrocarbons, or mixtures thereof. Preferably, the solvents are nonpolar, aliphatic hydrocarbons, and cycloaliphatic hydrocarbons or mixtures thereof. More preferred are $C_{5-10}$ aliphatic hydrocarbons, $C_{5-10}$ cycloaliphatic hydrocarbons or mixtures thereof. The most preferred solvents are cyclohexane or mixtures of cyclohexane with isopentane.

In Step I, the diene-to-difunctional initiator concentration is important. The upper limit on the diene-to-difunctional initiator ratio is based on the handleability of the reaction solution. If too much diene is present, then the reaction solution becomes too viscous to process. The lower limit on the diene-to-difunctional initiator ratio is based upon the ratio at which the rate of propagation or polymerization of polymer chains initiated by a difunctional initiator approaches the rate of those initiated by a monofunctional initiator. Above a certain ratio, no improvement is seen and the polymerization mixture may become difficult to handle. Preferably, the diene-to-difunctional initiator mole ratio is 30:1 or greater, more preferably 50:1 or greater and most preferably 100:1 or greater. Preferably, the diene-to-difunctional initiator mole ratio is 1000:1 or less and more preferably 600:1 or less.

Preferably, the process is performed under an inert atmosphere and in the absence of moisture and oxygen. In order to control the quality of the polymerization, it is preferable to contact the diene and hydrocarbon solvent and thereafter perform a blanking process on the mixture prior to addition of the difunctional initiator. The blanking process involves adding small amounts of an organolithium compound to remove impurities such as oxygen, water or acidic materials which may be in the reaction mixture. Blanking processes are well known in the art and one such process is described in U.S. Pat. No. 5,089,572, incorporated herein by reference.

The time period over which this polymerization occurs depends on the size of the vessel and heat transfer capability of the solvent. Preferably, such time period is 5 minutes or greater or more preferably 10 minutes or greater. Preferably, the reaction takes no more than 60 minutes and more preferably no more than 30 minutes.

The temperature of the reaction can be any temperature at which the reaction proceeds at a reasonable rate. The lower limit on the reaction temperature is that temperature which the reaction goes at a reasonable rate. The upper limit is based on the stability of the lithium chain ends. Preferably, the reaction is performed at 20° C. or more, more preferably 30° C. or more and even more preferably 40° C. or more. Preferably, the reaction is performed at 150° C. or less, more preferably 120° C. or less, even more preferably 90° C. or less and most preferably 80° C. or less.

It is generally preferred to apply positive pressure in the head space of the reactor in which the reaction takes place. Such positive pressure is useful in keeping volatile components under control during the polymerization reaction. The process is preferably conducted under agitation, such that the reaction mixture is well mixed, i.e., the mixing rate exceeds the reaction rate.

In Step II of the reaction, the remaining amount of hydrocarbon solvent and diene are added to the reaction mixture and the diene is allowed to react. Relative to the amount of hydrocarbon solvent added, the lower limit is based on handleability of the process stream and the need for heat dissipation provided by the solvent. The upper limit relative to the amount of solvent added is based on practicality, in that no more solvent should be used than is necessary to achieve the objectives. Preferably, the concentration of monomer solids in solvent is 5 weight percent or greater, more preferably 10 weight percent or greater and most preferably 16 weight percent or greater. Preferably, the concentration of monomer in solution is 30 weight percent or less, more preferably 25 weight percent or less, and most preferably 22 weight percent or less. A sufficient amount of diene is added to result in conjugated diene-based polymers having a molecular weight of preferably 30,000 or greater and more preferably 70,000 or greater. Preferably, sufficient diene is added to prepare a block copolymer having a molecular weight of 300,000 or less and more preferably 200 000 or less.

The additional diene is polymerized under conditions similar to those described relative to Step I. The reaction is allowed to proceed until substantially all of the diene is polymerized. Substantially complete as used herein means that the bulk of the polymerizable monomers have polymerized and only traces or small amounts of polymerizable monomer remain unreacted, if any is left unreacted.

Thereafter, monoalkenyl arene monomer is added to form the blocks derived from monoalkenyl arenes. A sufficient amount of monoalkenyl arene monomer is added to achieve a triblock copolymer having the above-described percentages of monoalkenyl arene contained therein and number average molecular weights described hereinafter. Preferably, the number average molecular weight of the final block copolymer is 31,500 or greater, more preferably 50,000 or greater and most preferably 75,000 or greater. Preferably, the number average molecular weight of the final block copolymer is 400,000 or less, more preferably 300,000 or less and most preferably 250,000 or less.

The process for polymerizing the monoalkenyl arene monomer is similar to the process for polymerizing the conjugated diene. The reaction is allowed to proceed until substantially all of the monoalkenyl arene monomer has polymerized. The polymerization is terminated by adding a terminating agent to the mixture. Such terminating agent is generally an acidic hydrogen-containing organic compound which functions by replacing the lithium atom at the living end of the polymer with a hydrogen atom, thereby terminating the reaction. Preferable terminating agents are lower alkanols, with $C_{1-5}$ lower alkanols particularly preferred.

The polymer may be recovered by means well known in the art, such as vacuum devolatilization.

It is contemplated that a co-initiator may be used in the practice of this invention. Such co-initiators are described in U.S. Pat. No. 4,960,842 (relevant portions incorporated herein by reference). It is preferred not to use such a co-initiator as this presents the problem of adding material to the process waste streams. Further, a residual amount of the co-initiator may remain as an impurity in admixture with the block copolymer.

The final polymer may be used in standard uses well known in the art for conjugated diene-monovinyl aromatic monomer copolymers, including in adhesive formulations, as elastomers, in asphalt formulations and in shoe soles. The block copolymers of this invention may be used according to well-known methods in the art. It is contemplated that the block copolymers prepared and described herein may be contacted with antioxidants, tackifying resins, oils and processing aids as dictated by the needs of the final end use.

SPECIFIC EMBODIMENTS

The following examples are included for illustrative purposes only and are not intended to limit the scope of the claims. Unless otherwise stated, all parts and percentages are by weight.

All reactions and polymerizations were conducted under a dry nitrogen atmosphere. All glass containers were baked at 150° C. overnight and flushed with nitrogen before use. The transfer of monomers and reagents was carried out with nitrogen flushed syringes or nitrogen pressurized stainless steel vessels. Solvents were purified by passage through a column of activated alumina. Styrene was purified by passage through alumina followed by vacuum distillation from calcium hydride. Isoprene was purified by passage through alumina followed by vacuum distillation from dibutylmagnesium.

Tensile properties of polymers were tested at 23° C. on specimens compression molded at 200° C. For each sample, about 6 grams of polymer were molded into a 0.025-inch (0.064 cm) thick square sheet, each side of which had a length of about 3.5 inches (8.9 cm). Four 0.025-inch (0.064 cm) thick, 3-inch (7.6 cm) long, dumbbell-shaped specimens were then cut from each sheet for testing. The crosshead speed for the tensile tests was 20 inches (50.8 cm) per minute. The data reported for each sample was an average of four measurements. The GPC measurements were made on a Waters 150C GPC equipped with six Varian MicroPak TSK columns (3 single pore and 3 mixed bed) and a UV photometer as the second detector.

Procedures—Preparation of Difunctional Initiator

The difunctional initiator (DFI) solution was prepared by adding 36 mL of cyclohexane solution containing 52.51 mmole of sec-butyllithium to a 500 mL 5 stainless steel vessel which contained 26.55 mmole of 1,3-bis[1-(methylphenyl)ethenyl]benzene in 384 mL of cyclohexane under nitrogen. The vessel and contents were heated to about 55° C. for 3 hours and then kept at about 40° C. for 16 hours. The resulting solution contained 0.0583 mmole of active DFI, 1,3-phenylene-bis-(3-methyl-1-(methylphenyl)pentylidene)bis(lithium), per mL of solution. The vessel was stored at room temperature and the initiator was used for many polymerization runs. Before each use, a small amount of DFI solution in excess of that required for the polymerization was transferred into a nitrogen-filled flask. The exact amount was then transferred by syringe from the flask to the reactor.

Example 1

Preparation of Styrene-Isoprene-Styrene (SIS) Triblock Polymer

A 1.3-liter jacketed stirred reactor was used as the polymerization vessel. To the nitrogen blanketed reactor, 10 mL of cyclohexane was added by syringe to cover the dump valve depression. To ensure adequate mixing of the small volume materials for the first stage polymerization, the additions were done in the following manner. To a separate nitrogen-filled flask, 20 mL of cyclohexane, 12.7 mL of DFI solution (0.740 mmole DFI), and 12 mL of isoprene were added at room temperature and mixed with a magnetic stirring bar. This solution was immediately transferred from the flask to the reactor by syringe. Additional 25 mL of cyclohexane was used to rinse the flask and syringe to ensure complete transfer. A total of about 68 mL cyclohexane was used for the first stage of polymerization. The isoprene concentration was 0.03 moles/liter and the isoprene-to-DFI mole ratio was 162. The DFI concentration was 0.009 mole/liter. A nitrogen pressure of 8-14 psi (55.1 to 96.5 kPa) was maintained in the head space of the reactor during the entire polymerization. The temperature controller of the heating jacket was then changed from 25° C. to 55° C. The jacket temperature rose to about 70° C. in 7 minutes and dropped to 55° C. in 20 minutes. At this point, the first stage polymerization was considered completed. To begin the second polymerization stage, more cyclohexane (550 mL) was added from a 1-liter stainless steel vessel to the reactor through a quick connect and more isoprene (105 mL=71.5 g) was added by syringe. An exothermic temperature rise occurred immediately and peaked at 88° C. in 7 minutes. About 40 minutes after the beginning of the second polymerization stage, 15 mL of styrene was added by syringe. About 30 minutes after the addition of styrene, 1 mL of 2-propanol was added to terminate the polymerization. The polymer solids in the final syrup was about 16.2 percent w/w as calculated from material balance. The cooled polymer solution was discharged from the reactor, treated with $CO_2$ and 1.5 grams of 2,6-ditertiarybutyl-4-methylphenol antioxidant was added. The polymer was recovered by vacuum devolatilization at an oven temperature of 190° C. for about 50 minutes. The polymer was analyzed and its properties tested. The results are compiled in Table I.

Example 2

Example 2 was performed according to the process used in Example 1 using a lower diene-to-DFI ratio, thereby preparing a polymer with a lower molecular weight. The results of the analysis and testing of the polymer are found in Table I.

Comparative Example 1

Preparation of Difunctional Initiator (DFI)

53.5 mL of cyclohexane solution containing 75.94 mmole of sec-butyllithium was added to a 500 mL stainless steel vessel which contained 38.04 mmole of 1,3-bis[1-phenylethenyl]benzene in 428 mL of toluene under nitrogen. To ensure complete reaction, the vessel and contents were allowed to stand at room temperature for 20 hours before use. The resulting solution contained 0.0735 mmole of active DFI, 1,3-phenylene-bis-(3-methyl-1-phenylpentylidene)bis(lithium), per mL of solution.

Preparation of Styrene-Isoprene-Styrene (SIS) Triblock Polymer

The same 1.3-liter reactor described in Example 1 was used. To the reactor, 675 mL of cyclohexane was added and deaired. Then 125 mL of distilled isoprene was added by syringe. After mixing well, a 50 mL aliquot of the feed was withdrawn by a syringe and transferred into a nitrogen-filled flask for the purpose of determining the amount of residual impurities in the mixture. The DFI solution was added dropwise to the aliquot until a light orange color was apparent. From this external titration result, the amount of DFI required to react with the impurities in the feed in the reactor (blanking) was calculated to be 0.02 mmole. Since the impurity level was so low, no blanking was made. The temperature controller of the heating jacket was set at 55° C. When the solution temperature reached about 52° C., 10.8 mL of the above-prepared DFI solution (containing 0.794 mmole DFI) was added. A nitrogen pressure of 8-14 psi (55.1 to 96.5 kPa) was maintained in the head space of the reactor during the entire polymerization. About 56 minutes after the addition of the DFI solution, 15 mL of styrene was added by syringe. About 34 minutes after the addition of styrene, 2 mL of 2-propanol was added to terminate the polymerization. The polymer solids in the syrup was about 15.7 percent w/w as calculated from material balance. The cooled polymer solution was discharged from the reactor, treated with $CO_2$ and 0.9 grams of 2,6-ditertiarybutyl-4-methylphenol antioxidant was added. The polymer was recovered by vacuum devolatilization at an oven temperature of 190° C. for about 50 minutes. The polymer was analyzed and its properties tested. The results are compiled in Table I.

pany). Two formulations were used. One was an equal blend of polymer and a $C_5$ hydrocarbon tackifier, ESCOREZ™ 1310 LC (trademark of Exxon Chemical) (formulation 1). The other was a blend of 100 part polymer, 100 part ESCOREZ™ 1310 LC, and 20 part mineral oil, TUFFLO™ 6056 (trademark of Atlantic Richfield Company) (formulation 2). As seen in Table II, the PSA properties of Examples 1 and 2 are comparable to those of the commercially-available polymer. The shear hold strengths of the PSA's of Examples 1 and 2 using 50/50 SIS/ESCOREZ™ 1310 formulation were at least as good as those from KRATON™ 1107 block copolymer. Whereas the shear hold strengths of the PSA's from Examples 1 and 2 using 100/100/20 SIS/ESCOREZ™ 1310/TUFFLO™ 6056 formulation were

TABLE I

| | Step I | | | | | | Steps II and III | | |
|---|---|---|---|---|---|---|---|---|---|
| Example No. | Cyclohexane ml | DFI Soln ml | DFI Soln mmol | Isop ml | Isop mmol | DFI Conc Mol/l | Isoprene/ DFI Mol Ratio | Cyclohexane ml | Isoprene g | Sty g |
| 1 | 55 | 12.7 | 0.740 | 12 | 120 | 0.009 | 162 | 550 | 71.5 | 13.6 |
| 2 | 55 | 13.5 | 0.789 | 12 | 120 | 0.010 | 152 | 560 | 70.1 | 13.6 |
| Comp 1* | 630 | 10.8 | 0.794 | 117 | 1170 | 0.001 | 1474 | — | — | 13.6 |

| Example No. | 3,4-Isop %[1] | Sty %[2] | Mnx 0.001 GPC | $M_w/M_n$ | MFR[3] (G) | Tensile, psi (kPa) | Elong % |
|---|---|---|---|---|---|---|---|
| 1 | 7.6 | 15.2 | 144 | 1.170 | 4.3 | 3360 (23150) | 1300 |
| 2 | 7.6 | 15.7 | 121 | 1.130 | 12.9 | 3360 (23150) | 1120 |
| Comp 1* | 7.5 | 15.4 | 159 | 1.44** | 3.3 | 880 (6063) | 1470 |

*All solvent and isoprene added initially
**Bimodal distribution
[1]Percentage of 3,4-isoprene addition in final polymer
[2]Percentage of styrene in the final polymer
[3]Melt flow rate Testing of Block Copolymers of Examples 1 and 2 and KRATON™ 1107 Block Copolymer for Adhesive Properties Pressure sensitive adhesives (PSA's) were formulated with the polymers of Examples 1 and 2 and KRATON™ 1107 block copolymer (trademark of Shell Chemical Company).

much higher than those from KRATON™ 1107 block copolymer.

TABLE II

| Example No. | Formulation No. | MFR (G) | Quick Stick #/linear inch (Kg/linear cm) | Peel Strength #/linear inch (Kg/linear cm) | Rolling Ball Tack cm | 75° C. Shear Hold (0.5" ht. × 1" w. × 1 lb. wt.) (1.27 cm ht. × 2.54 cm w. × .454 Kg wt.) min. |
|---|---|---|---|---|---|---|
| 1 | 1 | 4.3 | 3.3 (.59) | 4.8 (.86) | >20 | 4349 |
| | 2 | 4.3 | 2.0 (.36) | 3.2 (.58) | 4 | 1008 |
| 2 | 1 | 12.9 | 2.5 (.45) | 4.4 (.79) | >20 | 2765 |
| | 2 | 12.9 | 1.4 (.25) | 2.4 (.43) | 7 | 295 |
| KRATON™ 1107 Block Copolymer* | 1 | 10.3 | 2.7 (.49) | 4.7 (.85) | >20 | 2444 |
| | 2 | 10.3 | 2.1 (.38) | 2.3 (.41) | 4.5 | 184 |

*Trademark of Shell Chemical Company

What is claimed is:

1. A process for the preparation of a block copolymer which corresponds to the formula ABA wherein A comprises units derived from one or more monoalkenyl arenes; and B comprises units derived from one or more conjugated dienes and the residuum of a difunctional initiator; wherein the process comprises:

I) contacting (a) a difunctional initiator capable of initiating the polymerization of a compound containing a double bond with (b) a conjugated diene in an aliphatic or cycloaliphatic hydrocarbon solvent wherein the concentration of difunctional initiator is from about 0.002 moles/liter to about 0.06 moles/liter and the molar ratio of conjugated diene to difunctional initiator is from about 30:1 to about 1000:1 under conditions such that the conjugated diene polymerizes to a degree of polymerization of 30 or greater wherein the difunctional initiator is soluble in the solvent;

II) contacting with the polymerization mixture of I a sufficient amount of conjugated diene to prepare a polymer having a number average molecular weight of from about 30,000 to about 300,000 and an aliphatic or cycloaliphatic hydrocarbon solvent such that the mixture has a solids content of from about 5 to about 30 percent by weight, under conditions such that the added conjugated diene polymerizes; and III) contacting with the polymerization mixture of II a sufficient amount of monoalkenyl arene monomer to prepare a triblock copolymer having a number average molecular weight of about 31,500 to about 400,000 and an average weight percent of monoalkenyl arene contained in the block copolymer of from about 5 percent to about 50 percent by weight under conditions such that the monoalkenyl arene polymerizes.

2. A process according to claim 1 wherein the conjugated diene is polymerized in Step I to a degree of polymerization of 100 or greater.

3. The process of claim 2 wherein the difunctional initiator corresponds to the formula:

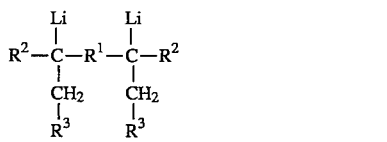

wherein $R^1$ is independently in each occurrence an alkylene moiety, arylene moiety or biarylene moiety which is bridged by a direct bond, alkylene, sulfur or oxygen; wherein such moieties may be optionally substituted with one or more non-interfering substituents;

$R^2$ is independently in each occurrence an alkyl, aryl, alkyl substituted aryl or aryl substituted alkyl moiety wherein such moieties may be optionally substituted with one or more non-interfering substituents; and $R^3$ is an alkyl moiety;

with the proviso that $R^1$ and $R^2$ are selected such that each carbon bound to a lithium moiety is also bound to at least one aromatic carbon atom.

4. The process of claim 3 wherein the concentration of difunctional initiator in Step I is from about 0.003 to about 0.03 moles/liter.

5. The process of claim 4 wherein the molar ratio of conjugated diene to difunctional initiator in Step I is from about 100 to 600.

6. The process of claim 5 wherein a sufficient amount of conjugated diene is added in Step II to prepare a polymer having a number average molecular weight of about 50,000 to about 250,000.

7. The process of claim 6 wherein the solvent is a cycloaliphatic hydrocarbon or a mixture of an aliphatic hydrocarbon and a cycloaliphatic hydrocarbon.

8. The process of claim 7 wherein the block copolymer produced has a polydispersity index of 1.3 or lower and a tensile strength at rupture of 1500 psi or greater.

9. The process of claim 8 wherein the monoalkenyl arene is styrene, the conjugated diene is isoprene and the hydrocarbon solvent is a mixture of cyclohexane and isopentane.

10. The process of claim 8 wherein the monoalkenyl arene is styrene, the conjugated diene is butadiene and the hydrocarbon solvent is a mixture of cyclohexane and isopentane.

11. A block copolymer which corresponds to the formula ABA wherein A comprises units derived from one or more monoalkenyl arenes; and B comprises units derived from one or more conjugated dienes and the residuum of a difunctional initiator; wherein the block copolymer is prepared by the process comprising:

I) contacting (a) a difunctional initiator capable of initiating the polymerization of a compound containing a double bond with (b) a conjugated diene in an aliphatic or cycloaliphatic hydrocarbon solvent wherein the concentration of difunctional initiator is from about 0.002 moles/liter to about 0.06 moles/liter and the molar ratio of conjugated diene to difunctional initiator is from about 30:1 to about 1000:1 under conditions such that the conjugated diene polymerizes to a degree of polymerization of 30 or greater wherein the difunctional initiator is soluble in the solvent;

II) contacting with the polymerization mixture of I a sufficient amount of conjugated diene to prepare a polymer having a number average molecular weight of from about 30,000 to about 300,000 and of an aliphatic or cycloaliphatic hydrocarbon solvent such that the polymerization mixture has a solids content of from 5 to 30 percent by weight, under conditions such that the added conjugated diene polymerizes; and III) contacting with the polymerization mixture of II a sufficient amount of monoalkenyl arene to prepare a triblock copolymer having a number average molecular weight of about 31,500 to about 400,000 and an average weight percent of monoalkenyl arenes incorporated in the block copolymer of from about 5 percent to about 50 weight percent under conditions such that the monoalkenyl arene polymerizes, wherein the block copolymer has a polydispersity index of 1.4 or lower, a percent elongation of 1120 or greater and a tensile strength of 1500 psi or greater wherein the block copolymer contains no residual co-initiator.

12. The product according to claim 11 wherein the conjugated diene is polymerized in Step I to a degree of polymerization of 100 or greater.

13. The product of claim 12 wherein the difunctional initiator corresponds to the formula

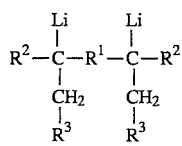

wherein $R^1$ is independently in each occurrence an alkylene moiety, arylene moiety or biarylene moiety which is bridged by a direct bond, alkylene, sulfur or oxygen, wherein such moieties may be optionally substituted with one or more non-interfering substituents;

$R^2$ is independently in each occurrence an alkyl, aryl, alkyl substituted aryl or aryl substituted alkyl moiety optionally substituted with one or more non-interfering substituents; and $R^3$ is an alkyl moiety;

with the proviso that $R^1$ and $R^2$ are selected such that each carbon bound to a lithium atom is also bound to at least one aromatic carbon atom.

14. The product of claim 13 wherein the concentration of difunctional initiator in Step I is from about 0.003 to about 0.03 moles/liter.

15. The product of claim 14 wherein the molar ratio of conjugated diene to difunctional initiator in Step I is from about 100 to 600.

16. The product of claim 15 wherein a sufficient amount of conjugated diene is added in Step II to prepare a polymer having a number average molecular weight of about 50,000 to about 250,000.

17. The product of claim 16 wherein the solvent is a cycloaliphatic hydrocarbon or a mixture of an aliphatic hydrocarbon and a cycloaliphatic hydrocarbon.

18. The product of claim 17 wherein the block copolymer produced has a polydispersity index of 1.3 or lower and a tensile strength at rupture of 1500 psi or greater.

19. The product of claim 17 wherein the monoalkenyl arene is styrene, the conjugated diene is isoprene and the hydrocarbon solvent is a mixture of cyclohexane and isopentane.

20. The product of claim 17 wherein the monoalkenyl arene is styrene, the conjugated diene is butadiene and the hydrocarbon solvent is a mixture of cyclohexane and isopentane.

21. An adhesive formulation comprising a block copolymer of claim 11.

22. An adhesive formulation comprising a block copolymer prepared by the process of claim 1.

* * * * *